(12) United States Patent
Smith et al.

(10) Patent No.: US 7,644,573 B2
(45) Date of Patent: Jan. 12, 2010

(54) GAS TURBINE INLET CONDITIONING SYSTEM AND METHOD

(75) Inventors: Raub Warfield Smith, Ballston Lake, NY (US); Seyfettin Can Gülen, Niskayuna, NY (US); Barrett David Gardiner, Malta, NY (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 11/405,482

(22) Filed: Apr. 18, 2006

(65) Prior Publication Data

US 2007/0240400 A1    Oct. 18, 2007

(51) Int. Cl.
*F02G 1/00* (2006.01)
*F02G 3/00* (2006.01)

(52) U.S. Cl. .................. 60/39.182; 60/39.511; 60/775

(58) Field of Classification Search .............. 60/39.182, 60/39.511, 775, 39.3, 39.53, 39.59, 728
See application file for complete search history.

(56) References Cited

U.S. PATENT DOCUMENTS

| | | | | |
|---|---|---|---|---|
| 4,753,068 A * | 6/1988 | El-Masri | .................. | 60/39.511 |
| 5,203,161 A * | 4/1993 | Lehto | ........................ | 60/39.53 |
| 5,222,356 A | 6/1993 | Evenson et al. | | |
| 5,235,801 A | 8/1993 | Evenson et al. | | |
| 5,285,629 A * | 2/1994 | Gounder | .................... | 60/39.12 |
| 5,301,500 A | 4/1994 | Hines | | |
| 5,329,758 A * | 7/1994 | Urbach et al. | .................. | 60/775 |
| 5,353,585 A * | 10/1994 | Munk | .......................... | 60/775 |
| 5,444,971 A * | 8/1995 | Holenberger | ................ | 60/783 |
| 5,457,951 A * | 10/1995 | Johnson et al. | ................ | 60/780 |
| 5,632,148 A * | 5/1997 | Bronicki et al. | ................ | 60/728 |
| 5,724,807 A * | 3/1998 | Schuetzenduebel et al. | ....................... | 60/39.464 |
| 5,752,378 A | 5/1998 | Mirsky et al. | | |
| 5,758,502 A * | 6/1998 | Utamura et al. | ................ | 60/728 |
| 5,790,972 A * | 8/1998 | Kohlenberger | .............. | 701/103 |
| 6,058,695 A | 5/2000 | Ranasinghe et al. | | |
| 6,059,522 A | 5/2000 | Gertz et al. | | |
| 6,089,024 A * | 7/2000 | Hatanaka | ...................... | 60/671 |
| 6,173,563 B1 | 1/2001 | Vakil et al. | | |
| 6,263,661 B1 * | 7/2001 | van der Burgt et al. | ...... | 60/39.17 |
| 6,318,065 B1 * | 11/2001 | Pierson | ........................ | 60/783 |
| 6,364,602 B1 | 4/2002 | Andrew et al. | | |
| 6,378,284 B1 * | 4/2002 | Utamura | ....................... | 60/775 |
| 6,470,686 B2 * | 10/2002 | Pierson | ........................ | 60/772 |
| 6,474,069 B1 * | 11/2002 | Smith | ........................... | 60/727 |
| 6,584,793 B2 * | 7/2003 | Fukushima et al. | ......... | 62/238.3 |
| 6,637,183 B2 * | 10/2003 | Viteri et al. | .............. | 60/39.182 |
| 6,644,013 B1 * | 11/2003 | Hatamiya et al. | ......... | 60/39.511 |
| 7,007,484 B2 * | 3/2006 | Stegmaier et al. | ............. | 60/772 |
| 7,353,654 B2 * | 4/2008 | Bolis et al. | ..................... | 60/775 |
| 7,448,217 B2 * | 11/2008 | Savic et al. | ................... | 60/775 |
| 2002/0194832 A1 * | 12/2002 | Smith | ....................... | 60/39.182 |
| 2004/0045300 A1 * | 3/2004 | Dovali-Solis | ................ | 60/778 |

* cited by examiner

*Primary Examiner*—William H Rodríguez
(74) *Attorney, Agent, or Firm*—Nixon & Vanderhye, PC (57) ABSTRACT

A system capable of both increasing warm day output and maintaining compressor operating margin across the ambient and load range of a gas turbine combined cycle installation. The proposed solution takes advantage of the fact that both goals can be satisfied by manipulation of compressor inlet air temperature. Specifically, the system is designed to heat inlet air as may be required to maintain safe compressor operating margin at low ambient air temperatures or when burning dilute fuels. In the alternative, the system is designed to cool inlet air on warm days.

20 Claims, 8 Drawing Sheets

GAS TURBINE INLET CONDITIONING SYSTEM AND METHOD

BACKGROUND OF THE INVENTION

The invention relates to a system and method for heating and cooling compressor inlet air supplied to a gas turbine for the purpose of maximizing power output and efficiency across the load and ambient range.

The combined cycle power plant in its simplest form is comprised of a gas turbine, a steam turbine, a generator, and a heat recovery steam generator (HRSG), with the gas turbine and steam turbine coupled to the single generator, in tandem on a single shaft. Multi-shaft arrangements having one or more gas turbine generators and a common steam turbine generator have been utilized. The thermal efficiency of combined cycle power plants is determined by the performance of the gas turbine in combination with its heat recovery bottoming cycle.

Gas turbines have two characteristics that can become obstacles to achieving maximum output and efficiency across the operating range.

First, gas turbines are constant volume flow machines. This gives them the natural characteristic of lower air mass flow and power output on warm days, when air is less dense, than on cooler days, when the air is more dense. In this regard, air density increases with decreasing temperature and results in higher mass flow through the gas turbine. The gas turbine output increases with increased air mass flow. It is thus often found desirable to increase air mass flow on warm days, typically by reducing inlet air temperature, to increase output.

Second, working fluid is supplied to the cycle by an air compressor which has aeromechanical operating limits that constrain operating compression ratio as a function of corrected speed, corrected air flow, and variable guide vane setting. Turbine inlet volume flow, and hence compressor pressure ratio, increases on cooler days since supply air mass flow increases with decreasing compressor inlet temperature while firing temperature is maintained (for maximum efficiency). Accordingly, the compressor operating limit can become an issue on colder days. Compressor operating limits are also more easily impinged in applications that burn dilute fuel, which also increases turbine volume flow and hence compressor pressure ratio. This situation may occur as a consequence of fuel composition or gasification of a low grade fuel which may produce fuel gas only one fifth as rich as natural gas.

It should also be noted that gas turbine compressors include one or more rows of variable guide vanes which can be modulated to reduce compressor inlet air flow. Although this may seem to offer a means of limiting compressor pressure ratio, and thus avoiding the compressor operating limit, the operating limit is itself a function of the guide vane setting such that the limit becomes more severe as air flow is reduced in this manner.

BRIEF DESCRIPTION OF THE INVENTION

The invention provides a system and method for selectively heating, or selectively heating or cooling compressor inlet air supplied to a gas turbine for maximizing power output and efficiency in a combined cycle power plant.

The invention may be embodied in a method of selectively heating ambient air entering the gas turbine compressor in a combined cycle power generating system having a plurality of turbines including a gas turbine having a compressor and a steam turbine, said turbines being drivingly coupled to one or more generators for producing electricity, and a condenser for condensing steam expanded in the steam turbine, comprising: extracting a selected fluid having a temperature greater than a temperature of said ambient air from at least one of said steam turbine and said condenser, and directing said ambient air through a heat exchanger for receiving heat directly or indirectly from said selected fluid, whereby a temperature of said ambient air is elevated in said heat exchanger.

The invention may also be embodied in a combined cycled power generating system comprising: a gas turbine having a compressor; a steam turbine; a condenser for condensing spent steam expanded in said steam turbine; a heat exchanger for controlling a temperature of inlet air to said compressor; and structure defining a flow path for a working fluid through said heat exchanger and operatively coupled to one of said steam turbine and said condenser for selectively heating said working fluid for elevating a temperature of said inlet air via said heat exchanger.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
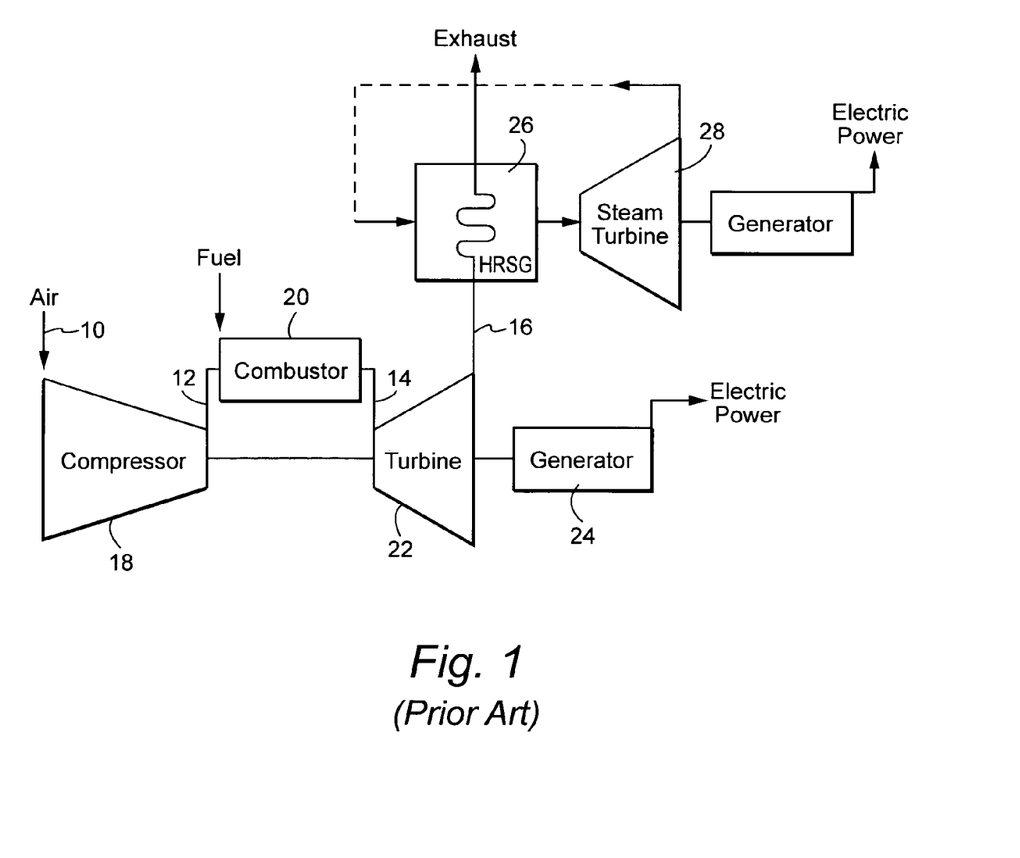
FIG. 1 is a schematic diagram of a combined cycle gas turbine.

By way of background and with reference to the schematic illustration of FIG. 1, a typical combined cycle gas turbine includes, in serial-flow relationship, an intake or inlet for air 10, a compressor 18, a combustor 20, a turbine 22, a heat recovery steam generator (HRSG) 26 and its associated steam turbine 28. Thus, inlet air 10 enters the axial flow compressor 18 at ambient conditions. Ambient conditions vary from one location to another and day to day. Therefore, for comparative purposes standard conditions are used by the gas turbine industry. Those standard conditions are 59° F. (15° C.), 14.696 psia (1.013 bar), and 60% relative humidity. The standard conditions were established by the International Standards Organization ("ISO") and are generally referred to as ISO conditions.

The compressed air 12 enters the combustion system 20 where fuel is injected and combustion occurs. The combustion mixture 14 leaves the combustion system and enters the turbine 22. In the turbine section, energy of the hot gases is converted into work. This conversion takes place in two steps. The hot gases are expanded and a portion of the thermo-energy is converted into kinetic energy in the nozzle section of the turbine. Then, in the bucket section of the turbine a portion of the kinetic energy is transferred to the rotating buckets and converted to work. A portion of the work developed by the turbine 22 is used to drive the compressor 18 whereas the remainder is available to generator 24 for generating power. The exhaust gas 16 leaves the turbine and flows to the HRSG 26.

Many factors affect gas turbine performance. As mentioned above, air temperature is an important factor in gas turbine performance. Since the gas turbine receives ambient air as inlet air, its performance will be changed by anything that affects the mass flow of the air intake to the compressor; that is changes from the reference conditions of 59° F. and 14.696 psia. Each turbine model has its own temperature-effect curve as it depends on the cycle parameters and component efficiencies as well as air mass flow.

Figure 2:
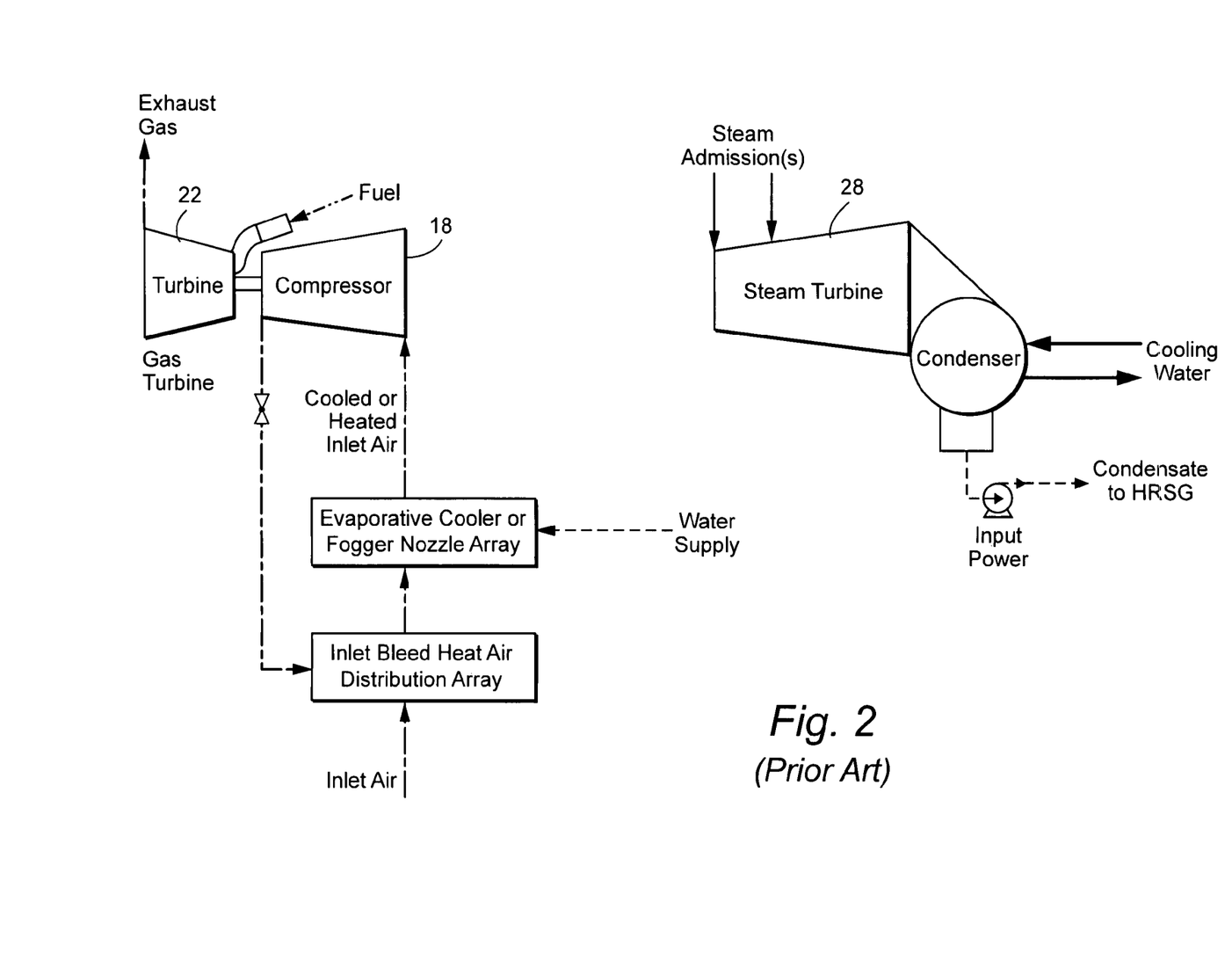
FIG. 2 is a schematic diagram of a conventional system using combined inlet bleed heat and fogging.

Several means are commonly employed to increase gas turbine output on warm days. Most involve reducing gas turbine inlet air temperature to increase mass flow and output. This can be achieved by evaporative cooling of the inlet air either by direct contact (air passing through wetted fill media) or by direct injection of water into the inlet air, which then cools the air as the droplets evaporate (inlet fogging) (FIG. 2). These methods cannot cool the inlet air below its wet bulb temperature when air becomes saturated (e.g. 79° F. for 100° F.-40% RH day). Overspraying beyond this point results in water droplets entering the compressor. While evaporation of these droplets during compression is beneficial due to an intercooling effect, the detrimental effect of their impinging on compressor blades can be problematic to sustained performance and machine integrity.

Figure 3:
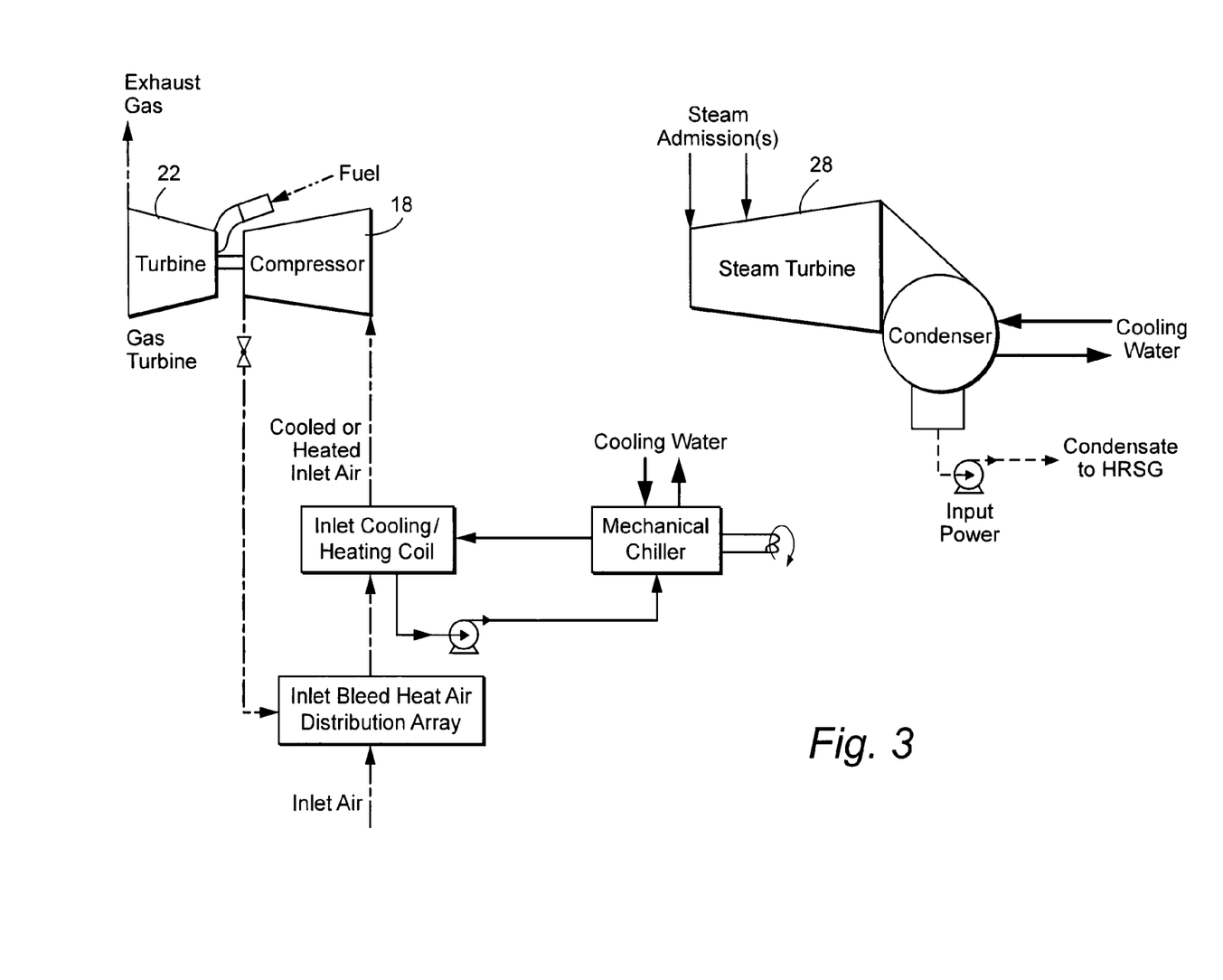
FIG. 3 is a schematic diagram of a conventional system using combined inlet bleed heat and mechanical chilling.

Another approach is to cool the inlet air indirectly, usually via a coil placed in the gas turbine inlet duct and provided with chilled water from a mechanical refrigeration system (FIG. 3). Two major mechanical refrigeration systems that are commercially available are absorption chillers and package chillers with mechanically (e.g. electric motor) driven refrigerant compressors. These systems can cool the air down to the dew point (e.g. 81° F. for 100° F.-40% RH day). If sufficient chiller capacity is provided further cooling below the dew point is possible by condensing the ambient moisture.

Warm day power may also be increased by a boost compressor (which pressurizes the inlet air to increase its density), or by an augmentation compressor that compresses a second flow for addition at the combustor (not illustrated herein).

Elevated firing temperature in the gas turbine is a key element in providing higher output per unit mass flow, enabling increased combined cycle efficiency. Moreover, for a given firing temperature, there is an optimal cycle pressure ratio which maximizes combined cycle efficiency. The optimal cycle pressure ratio can be theoretically shown to trend ever-higher with increasing firing temperature. Compressors for these turbines are thus subjected to demands for higher levels of pressure ratio, within the simultaneous goals of minimal parts count, operational simplicity, and low overall cost. Moreover, the compressor must enable this heightened level of cycle pressure ratio at a compression efficiency that augments the overall cycle efficiency. Finally, the compressor must perform in an aerodynamically and aeromechanically stable manner under a wide range of mass flow rates associated with varying power output characteristics of combined cycle operation.

Air consumed by industrial gas turbine engines always contains an unknown amount of airborne, solid and liquid particulate. These include dirt, dust, pollen, insects, oil, seawater salt, soot, unburned hydrocarbons, etc. Deposits form on the compressor turbo machinery blading when these airborne materials adhere to the blading and to each other, leading to changes in the blade aerodynamic profile, blade surface conditions, and flow incidence angle. This fouling causes a concomitant deterioration in the performance parameters of mass flow, thermodynamic efficiency, pressure ratio and surge pressure ratio. This latter influence can cause a degradation in the margin between the operating pressure ratio and the surge line, commonly referred to as the surge margin.

The maximum pressure ratio that the compressor can deliver in continuous duty is commonly defined in terms of a margin from the surge pressure ratio line. Compressor surge is the low frequency oscillation of flow where the flow separates from the blades and reverses flow direction through the machine, i.e., it serves as a physical limit to compressor operation at a given speed.

The conventional approach to compressor protection is to program into the gas turbine control a so-called Operating Limit Line that affords a margin from a new and clean compressor surge boundary. One of the considerations in establishing this margin is a fixed allowance for the anticipated level of compressor fouling and the corresponding effect on surge margin. Once set, this allowance is not modified over time and/or operating conditions.

Figure 4:
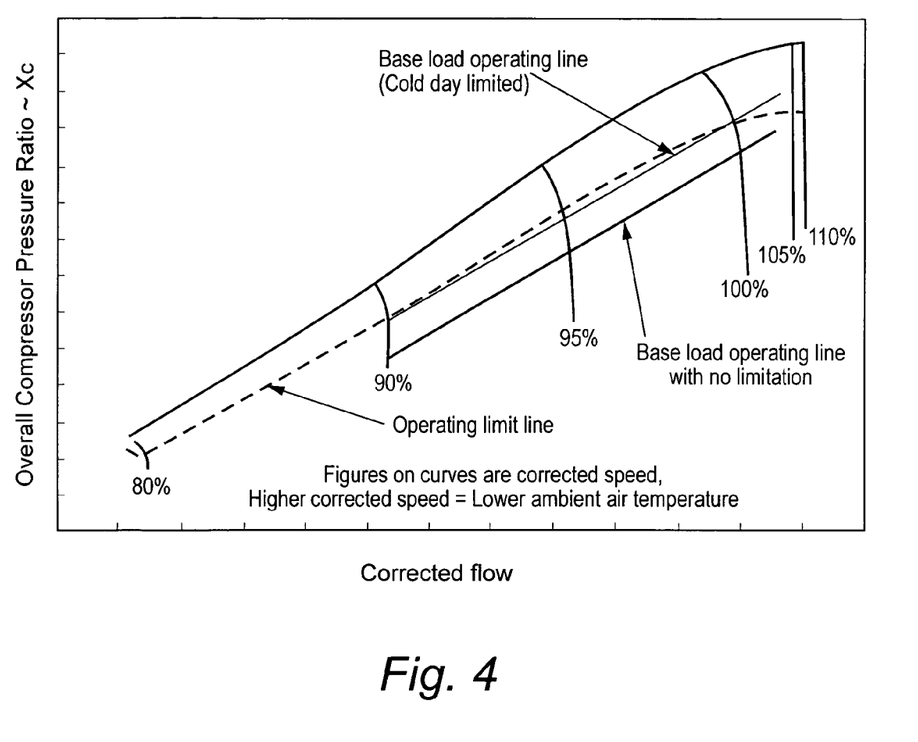
FIG. 4 is compressor map and operating limit line schematically illustrating the performance characteristics of an industrial gas turbine compressor.

Referring to FIG. 4, there is illustrated a typical gas turbine compressor map which is a plot of pressure ratio versus flow. The compressor map is defined by several lines of constant rotational speed corrected to ISO conditions of 14.696 Pisa and 518.67° R.

The map of FIG. 4 is further defined by a line of surge pressure ratios. As noted above, the surge line is that pressure ratio at which the flow separates from the blades and reverses direction, i.e., the limit of the compressor at a given speed.

An Operating Limit Line is defined to provide a desired margin from the pressure ratios associated with operational limits, taking into account both surge pressure ratio and flow roll-back. These operational limits include the onset of rotating stall and the onset of excessive blade strains, at elevated pressure ratios near the surge line. Operation above the Operating Limit Line is not permitted by the gas turbine control system. Thus, the Operating Limit Line is the line established by the manufacturer of the gas turbine as the maximum operating limit for the compressor.

The nominal (Base Load) operating line is the operating condition at which the turbine and compressor will operate at varying corrected speed. A nominal operating line of allowable combinations of pressure ratio and flow is defined by the first-stage turbine nozzle area which is chosen to provide a desired surge margin at Cold-Day conditions. A design point is defined as the intersection of the 100% corrected speed line and the nominal operating line.

Countermeasures to prevent a compressor operating limit issue takes three forms. These are firing temperature (which can be reduced to lower turbine inlet volume flow and hence compressor pressure ratio), overboard compressor bleed (which reduces pressure ratio at fixed guide vane setting), and compressor inlet air heating (which reduces airflow and pressure ratio). Inlet bleed heating combines two of these approaches by discharging hot compressor discharge bleed air into the inlet to raise the inlet air temperature. FIGS. 2 and 3 show two prior art systems combining inlet bleed heat for compressor operating limit margin protection with inlet fogging, evaporative cooling, or mechanical chilling for warm day.

As is always true in power plant design, the specific solution chosen to improve warm day output or maintain compressor operating margin is a function of site specific ambient and operating condition, the performance available from each competing system, and the costs required to implement and operate.

The invention provides an improved system capable of both increasing warm day output and maintaining compressor operating margin across the ambient and load range of a gas turbine combined cycle installation. The proposed solution takes advantage of the fact that both goals can be satisfied by manipulation of compressor inlet air temperature. Specifically, the invention may be embodied in a system designed to cool inlet air on warm days that can also heat inlet air as may be required to maintain safe compressor operating margin at low ambient air temperatures or when burning dilute fuels, with only a small additional incremental cost.

Figure 5:
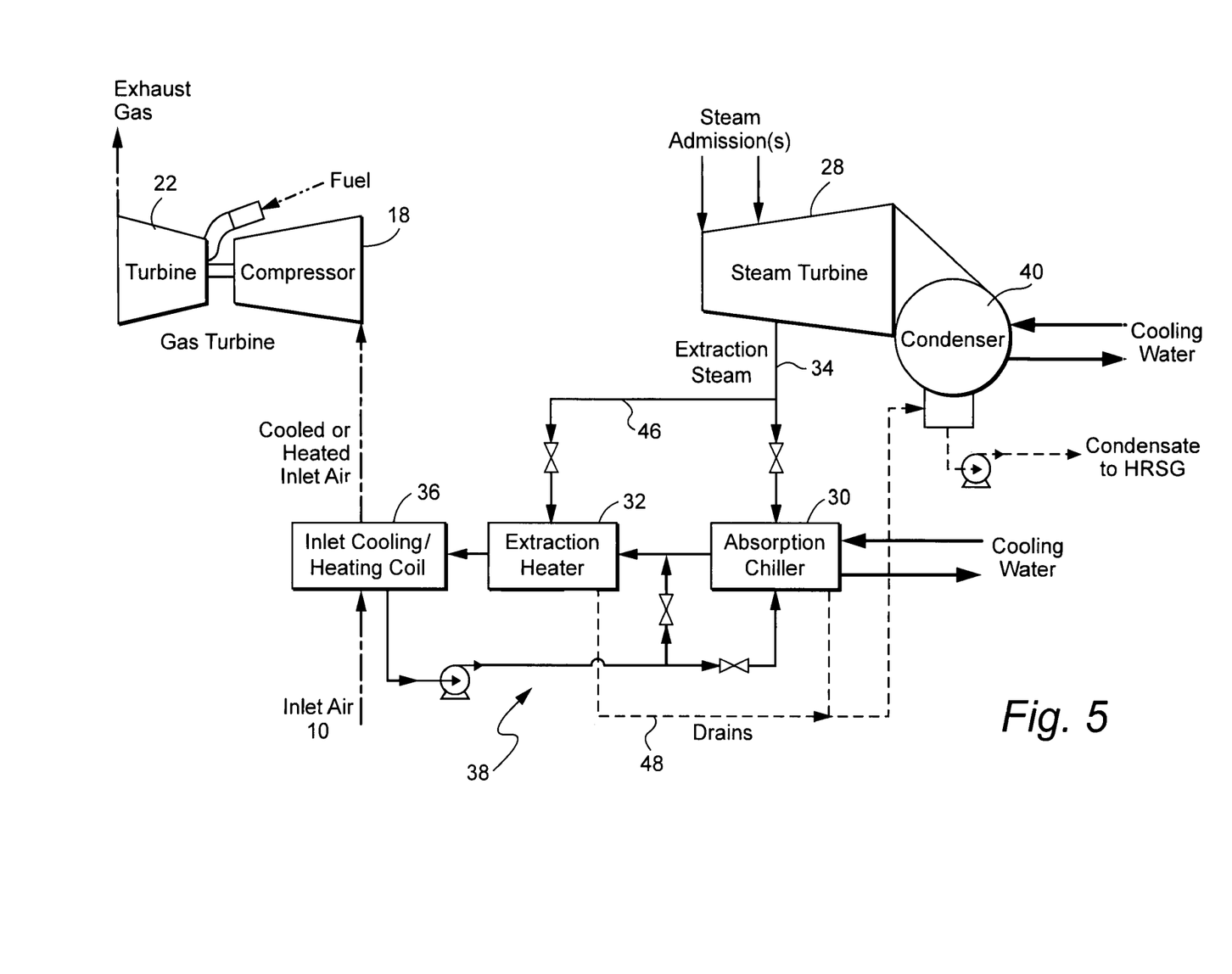
FIG. 5 is a schematic diagram of a combined cycle gas turbine with heating and cooling of the compressor inlet air according to an example embodiment of the invention.

An example system configuration for combined cycle applications embodying the invention is illustrated in FIG. 5. This system employs, e.g., a commercially available absorption liquid chiller (ALC) 30 for warm day power augmentation in combination with an extraction heater 32 which uses steam extracted at 34 from the steam turbine 28 as necessary to heat the gas turbine inlet air 10 via an inlet cooling/heating coil 36 when more compressor operating limit margin is needed.

The absorption liquid chiller (ALC) 30 utilizes steam turbine extraction steam 34 as a heat source in its generator to separate refrigerant vapor from a liquid solution. (An example suitable ALC is the Horizon® Single-Stage Steam-Fired Absorption Unit manufactured by Trane.)

The ALC is advantageous relative to other mechanical chilling systems such as air- or water-cooled package chillers in that it eliminates the need for vapor compression and hence a large parasitic power consumer. Sample calculations show that the steam turbine output penalty due to extraction steam is deminimous and the very small pump power requirement of the ALC is negligible. As such, for the same inlet chilling duty and power augmentation, the system with the ALC leads to better combined cycle net efficiency.

As mentioned above, the illustrated system interposes an extraction heater 32 in the gas turbine inlet chiller coil 36 coolant loop 38. The extraction heater can be used to alternatively heat the fluid in the coolant loop 38 (and hence the inlet air 10) when required to increase compressor operating limit margin. Thus, in chilling mode the extraction steam 34 only feeds the chiller 30, and in heating mode the extraction steam 34 only supplies the heater 32. This configuration provides for very efficient operation in both heating and chilling modes since the extraction steam 34 has already done most of its work in the steam turbine before its remaining heat (primarily latent) is used to heat inlet air 10 or provide heat for the ALC 30.

A secondary benefit of using extraction steam 34 for these purposes is the reduction in condenser 40 heat rejection and hence condenser pressure and steam turbine exhaust loss, which both help to offset the power lost by not expanding the steam 34 to make power. In applications employing air as the cooling medium the reduction of condenser heat rejection at high ambients by use of extraction steam 34 for the ALC 30 also has potential capital cost benefit by reducing the required air condenser size.

Figure 6:
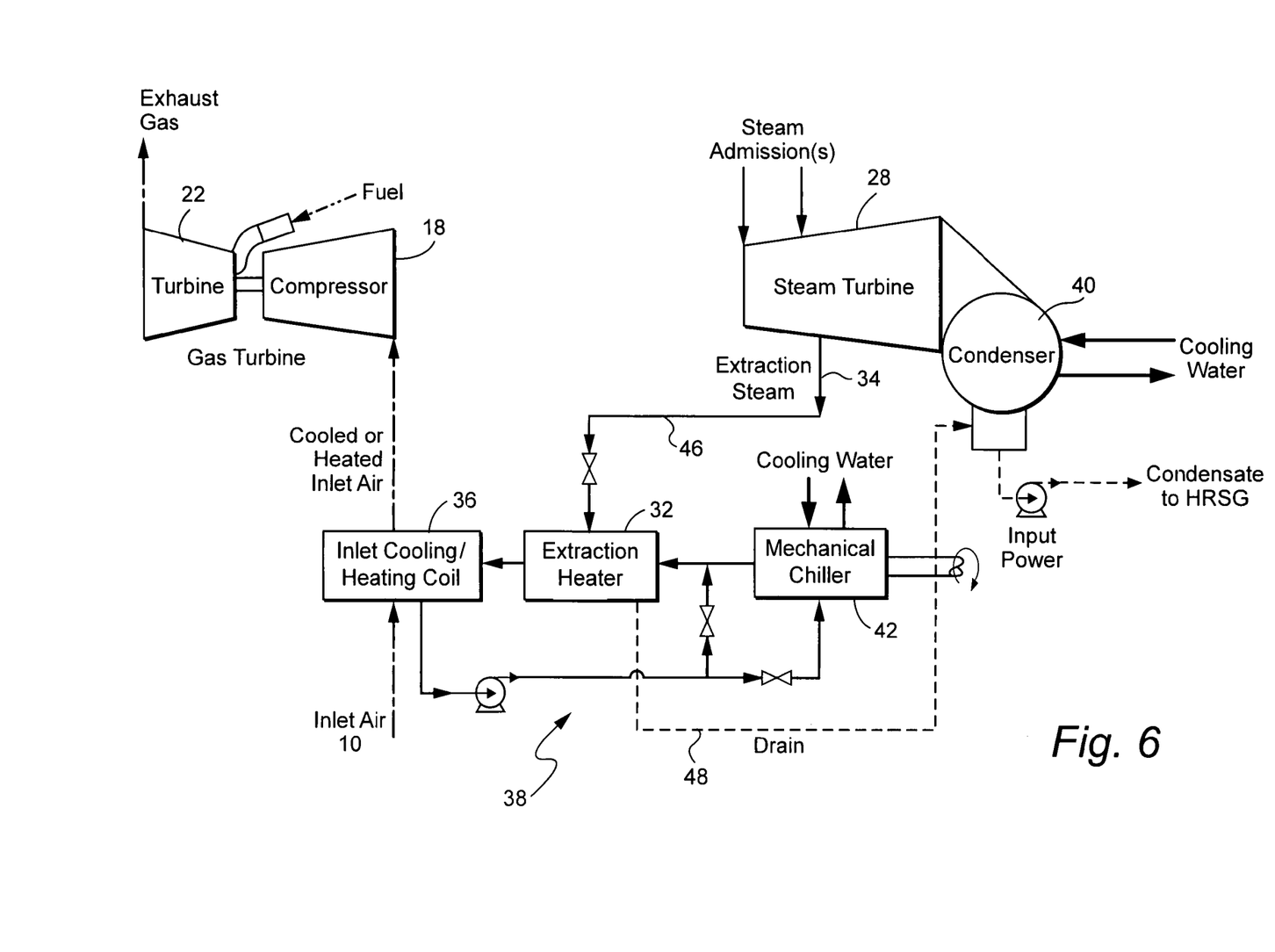
FIG. 6 is a schematic diagram of a combined cycle gas turbine with heating and cooling of the compressor inlet air according to another example embodiment of the invention.

In some applications the added performance benefit of the ALC 30 via steam turbine extraction 34 may not be justified by the higher chiller cost in comparison to a package chiller system with, e.g., electric motor driven vapor compression. This leads to the alternate embodiment illustrated in FIG. 6, which retains the extraction heater 32 for compressor operating limit control but replaces the ALC 30 with a mechanical chiller 42. This embodiment otherwise corresponds to the FIG. 5 embodiment.

Figure 7:
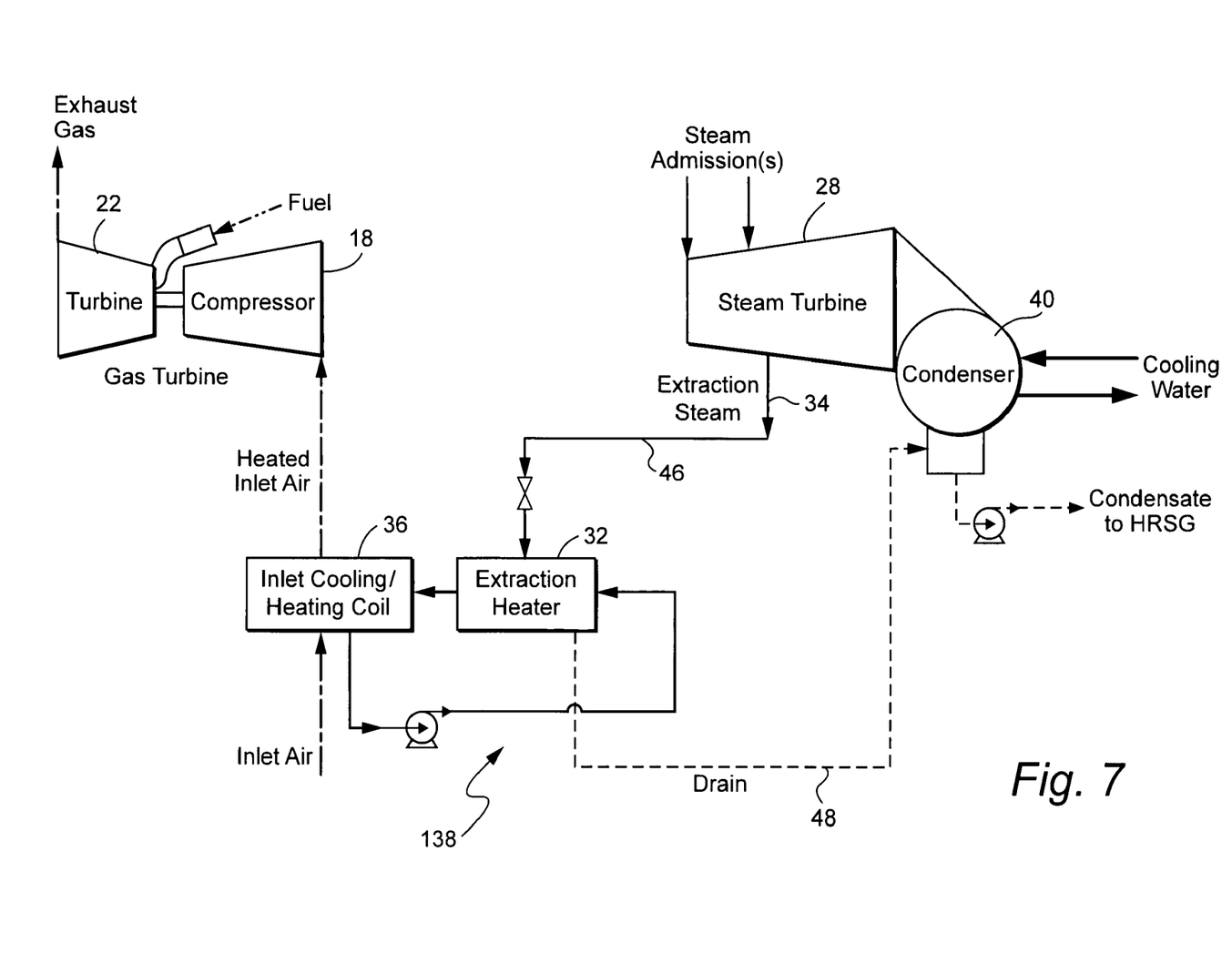
FIG. 7 is a schematic diagram of a combined cycle gas turbine with heating of the compressor inlet air according to yet another example embodiment of the invention.

A further embodiment, illustrated in FIG. 7, addresses the situation where customer site conditions or plant design do not justify warm day power augmentation at all, in which case the system devolves to a heating system only, incorporating an extraction heater 32 and heating fluid flow loop 138. This system offers improved cold day efficiency as compared to prior art inlet bleed heat systems.

Figure 8:
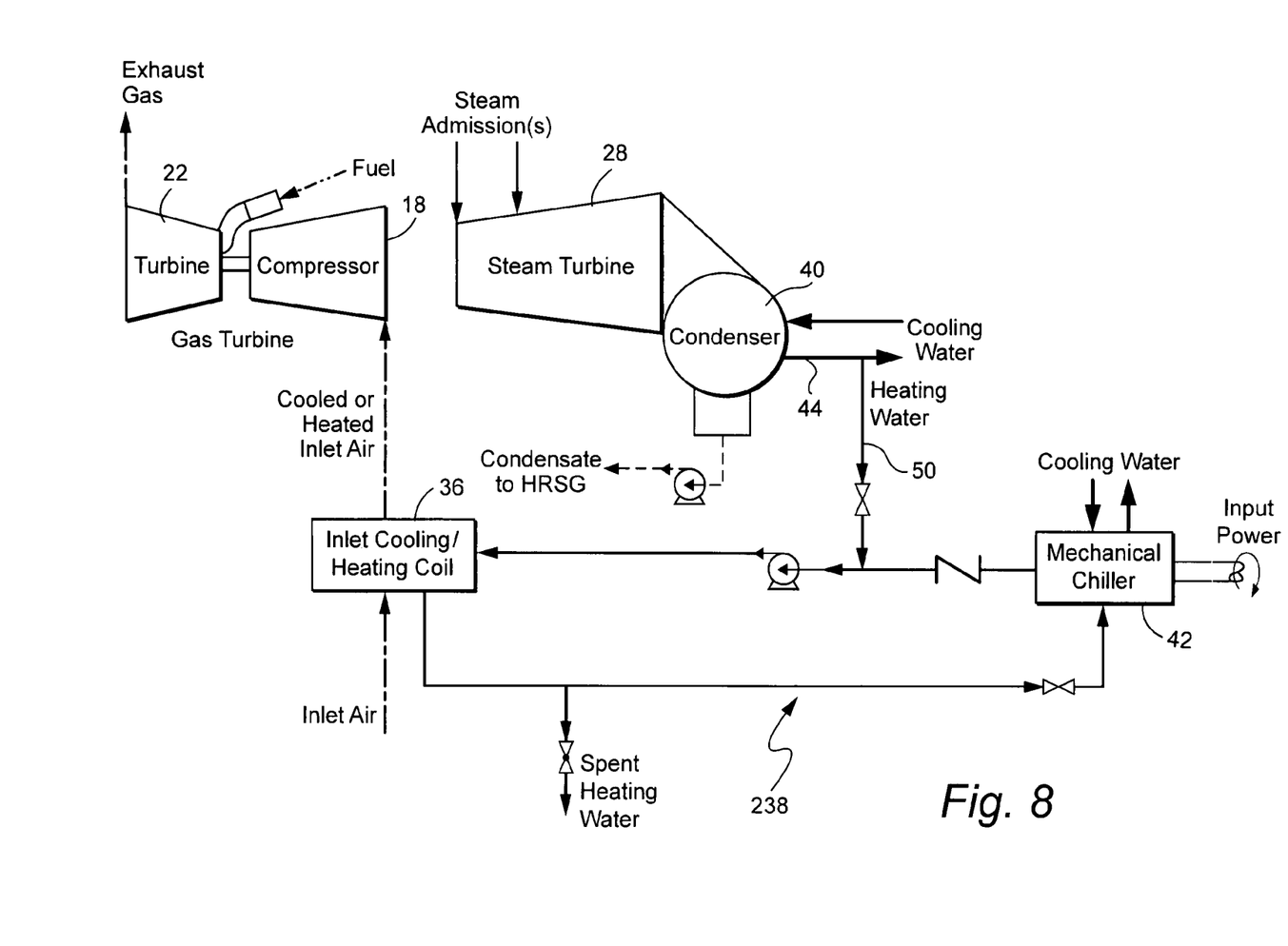
FIG. 8 is a schematic diagram of a combined cycle gas turbine with heating and cooling of the compressor inlet air according to a further example embodiment of the invention.

A final example embodiment, illustrated in FIG. 8, addresses the situation where the compressor operating limit occurs on cold days such that spent condenser cooling water 44 is warm enough to heat the gas turbine inlet air (in lieu of steam turbine extraction steam 34). This configuration eliminates the steam turbine extraction piping 46, the extraction heater 32, and drain piping 48 (if a package chiller 42 is used for warm day augmentation), substituting a condenser discharge water feed 50 to fluid flow loop 238 to the gas turbine inlet coil 36. This should be a lower cost solution where the gas turbine inlet coil 36 is already large enough (sized for warm day chilling) and the gas turbine inlet temperature required for operating limit margin is always sufficiently lower than condenser cooling water discharge 44 temperature. The FIG. 8 system still offers improved cold day efficiency versus the prior art inlet bleed heat systems and may exceed that of the FIG. 5 embodiment in some circumstances.

The warm ambient performance is a significant function of the site ambient humidity and the economics of capital investment versus added value from output. The present invention does not per se improve warm ambient performance relative to prior art, but does provide a synergistic solution that addresses the compressor operating limit by adding an efficient heating capability to the conventional system for warm ambient power augmentation (inlet chilling).

The low ambient output of the proposed invention is essentially the same as attainable from an inlet bleed heat system. However, the low ambient heat rate performance of the proposed invention is significantly better than for the conventional inlet bleed heat system. This heat rate advantage increases at part load since the target gas turbine inlet temperature can be set to maximize efficiency (which may increase compressor operating margin beyond the minimum required), whereas the best efficiency attainable with inlet bleed heat is never better than while the machine is run at its minimum operating margin (minimum inlet bleed heating). Also, the inlet bleed heating system typically has a minimum turndown required for uniform compressor inlet temperature profile which requires the system to be run with more than the minimum inlet bleed flow when the unit only needs a small improvement (for instance just below 20° F.).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle power generating system having a plurality of turbines including a gas turbine having a compressor and a steam turbine, said turbines being drivingly coupled to one or more generators for producing electricity, and a condenser for condensing steam expanded in the steam turbine, a method of selectively heating ambient air entering the gas turbine compressor, comprising:

extracting a selected fluid having a temperature greater than a temperature of said ambient air from at least one of said steam turbine and said condenser, directing said ambient air through a heat exchanger for selectively receiving heat directly or indirectly from said selected fluid having a temperature greater than a temperature of said ambient air entering the heat exchanger, whereby a temperature of said ambient air is selectively elevated in said heat exchanger, and feeding the ambient air from said heat exchanger to the gas turbine compressor.

2. A method as in claim 1, wherein heat from said selected fluid is transferred to a working fluid cycled through said heat exchanger.

3. A method as in claim 2, wherein said extracted fluid is directly added to said working fluid.

4. A method as in claim 1, wherein said selected fluid is steam extracted from said steam turbine.

5. A method as in claim 1, wherein said condenser is water cooled and said selected fluid is spent condenser cooling water having a temperature greater than the temperature of the ambient air entering said heat exchanger.

6. A method as in claim 2, further comprising selectively cooling said working fluid to selectively cool said inlet air.

7. A method as in claim 6, wherein said working fluid is selectively cooled using an absorption liquid chiller.

8. A method as in claim 7, wherein said selected fluid is steam extracted from said steam turbine, and wherein said extracted steam is selectively directed to said absorption liquid chiller as a heat source in its generator.

9. A method as in claim 6, wherein said working fluid is selectively cooled using a chiller with electric motor driven refrigerant compressors.

10. A combined cycled power generating system comprising:

a gas turbine having a compressor;

a steam turbine;

a condenser for condensing spent steam expanded in said steam turbine;

a heat exchanger for controlling a temperature of ambient air as inlet air to said compressor;

structure defining a flow path for a working fluid through said heat exchanger and operatively coupled to one of said steam turbine and said condenser for selectively heating said working fluid to a temperature greater than a temperature of ambient air entering the heat exchanger for elevating a temperature of said inlet air via said heat exchanger; and structure defining a flow path for ambient air from said heat exchanger directly to said compressor.

11. A combined cycle as in claim 10, wherein an absorption liquid chiller is disposed along said working fluid flow path for selectively cooling said working fluid.

12. A combined cycle as in claim 11, wherein said absorption liquid chiller is operatively coupled a flow path for steam extracted from said steam turbine for selectively use as a heat source in a generator of said absorption liquid chiller.

13. A combined cycle as in claim 10, wherein a chiller with electric motor driven refrigerant compressors is disposed along said working fluid flow path for selectively cooling said working fluid.

14. A combined cycle as in claim 10, wherein said structure defining the flow path for working fluid is operatively coupled to a spent cooling water stream of said condenser for flowing a portion of said spent cooling water to said heat exchanger.

15. A combined cycle as in claim 14, wherein a chiller with electric motor driven refrigerant compressors is disposed along said working fluid flow path for selectively cooling said working fluid.

16. A combined cycle as in claim 10, wherein said structure defining said working fluid path is disposed in heat exchange relation with a flow path for steam extracted from said steam turbine for selectively heating said working fluid with said extracted steam.

17. A combined cycle as in claim 16, wherein an absorption liquid chiller is disposed along said working fluid flow path for selectively cooling said working fluid.

18. A combined cycle as in claim 17, wherein said absorption liquid chiller is operatively coupled said flow path for steam extracted from said steam turbine for selectively diverting said extracted steam thereto as a heat source in a generator thereof.

19. A combined cycle as in claim 16, wherein a chiller with electric motor driven refrigerant compressors is disposed along said working flow path for selectively cooling said working fluid.

20. A combined cycled power generating system comprising:

a gas turbine having a compressor;

a steam turbine;

a condenser for condensing spent steam expanded in said steam turbine;

a heat exchanger for controlling a temperature of inlet air to said compressor; and structure defining a flow path for a working fluid through said heat exchanger and operatively coupled to one of said steam turbine and said condenser for selectively heating said working fluid for elevating a temperature of said inlet air via said heat exchanger, wherein one of 1) an absorption liquid chiller and 2) a chiller with mechanically driven refrigerant compressors is disposed along said working fluid flow path for selectively cooling said working fluid.

* * * * *

UNITED STATES PATENT AND TRADEMARK OFFICE
CERTIFICATE OF CORRECTION

PATENT NO. : 7,644,573 B2  Page 1 of 1
APPLICATION NO. : 11/405482
DATED : January 12, 2010
INVENTOR(S) : Smith et al.

It is certified that error appears in the above-identified patent and that said Letters Patent is hereby corrected as shown below:

At column 3 line 59, delete "within" and insert --with--

Signed and Sealed this

Ninth Day of March, 2010

David J. Kappos
*Director of the United States Patent and Trademark Office*